United States Patent [19]

Zieve

[11] Patent Number: 4,990,805
[45] Date of Patent: Feb. 5, 1991

[54] LOW VOLTAGE ELECTROMAGNETIC PULSE ACTUATOR

[76] Inventor: Peter B. Zieve, 5766-27th Ave. NE., Seattle, Wash. 98105

[21] Appl. No.: 389,322

[22] Filed: Aug. 3, 1989

Related U.S. Application Data

[62] Division of Ser. No. 54,587, May 27, 1987.

[51] Int. Cl.⁵ ............................................. H02K 33/00
[52] U.S. Cl. ................................... 310/27; 29/243.54; 72/430; 318/114; 318/130
[58] Field of Search ........................ 310/14, 16, 17, 27, 310/30; 318/114, 130, 132, 128; 72/56, 430; 29/421 M, 254, 243.53, 243.54

[56] References Cited

U.S. PATENT DOCUMENTS

| | | | |
|---|---|---|---|
| 3,646,791 | 3/1972 | Leftheris | 72/56 |
| 3,731,370 | 5/1973 | Leftheris | 29/509 |
| 4,151,735 | 5/1979 | McDermott | 29/243.54 X |
| 4,553,074 | 11/1985 | Jacquemet | 318/130 |

*Primary Examiner*—Mark O. Budd
*Attorney, Agent, or Firm*—Graybeal, Jensen & Puntigam

[57] ABSTRACT

The apparatus includes a driver (86). The driver (86) includes a front portion (90) which is adapted to receive a riveting die (92), and a rear portion (88) which is a copper plate. The copper plate (88) is receptive to the establishment of magnetic field currents therein. The actuator further includes a coil (72) which is positionable in close proximity to the copper plate (88) of the driver (86). The apparatus further includes a bank of capacitors having a stored charge so as to produce a current pulse through the coil (72) when the capacitors are connected to the coil (72). Still further, the apparatus includes a control means for selectively connecting the stored charge from the capacitors to the coil. The copper plate (88) is relatively thick compared to that used in high voltage electromagnetic actuators, such that the present apparatus requires only a relatively low voltage in order to produce the required high forces to accomplish the desired riveting.

8 Claims, 6 Drawing Sheets

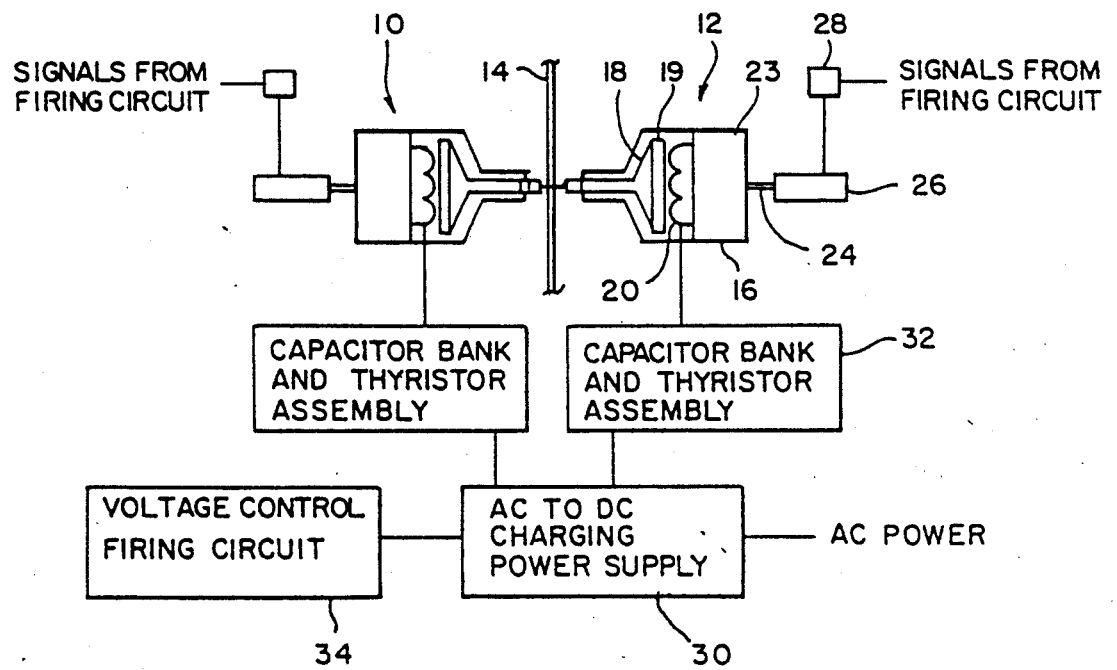
FIG. 1
FIG. 4
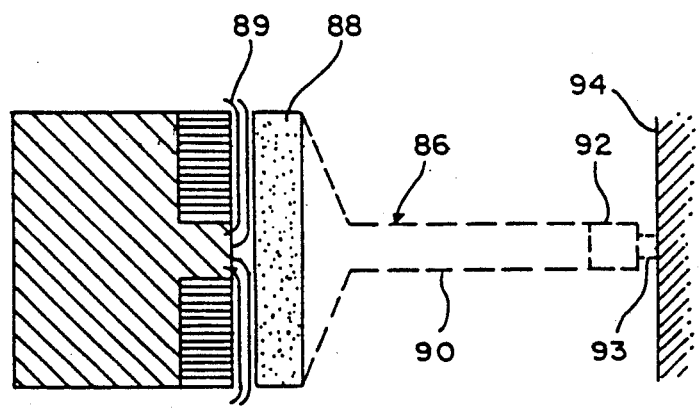

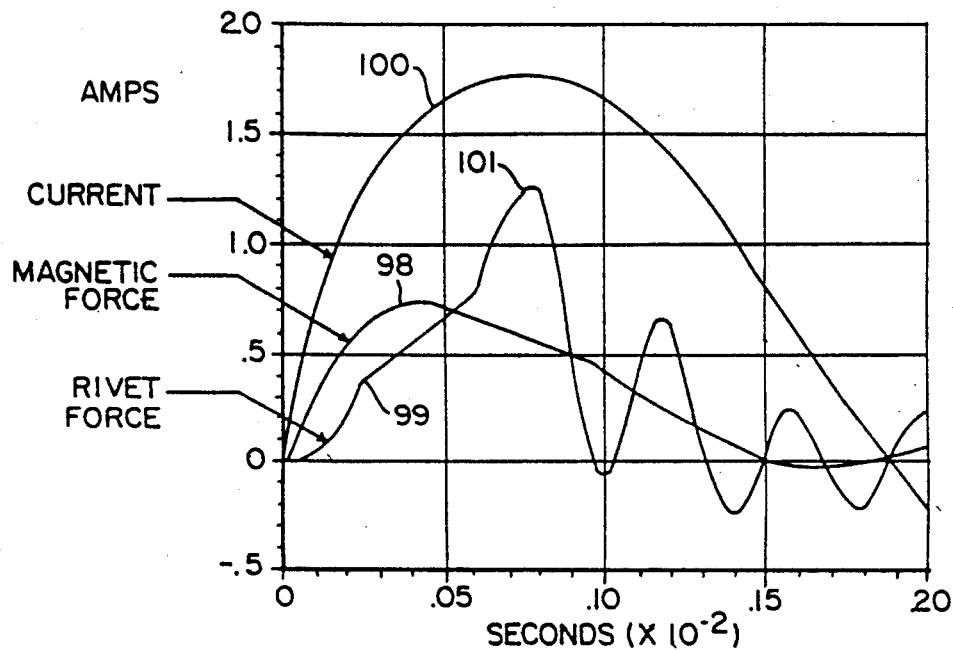
FIG. 13
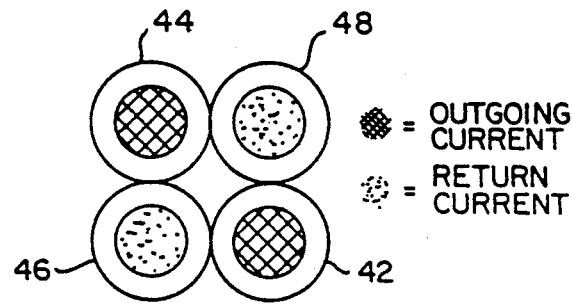
FIG. 14
FIG. 15
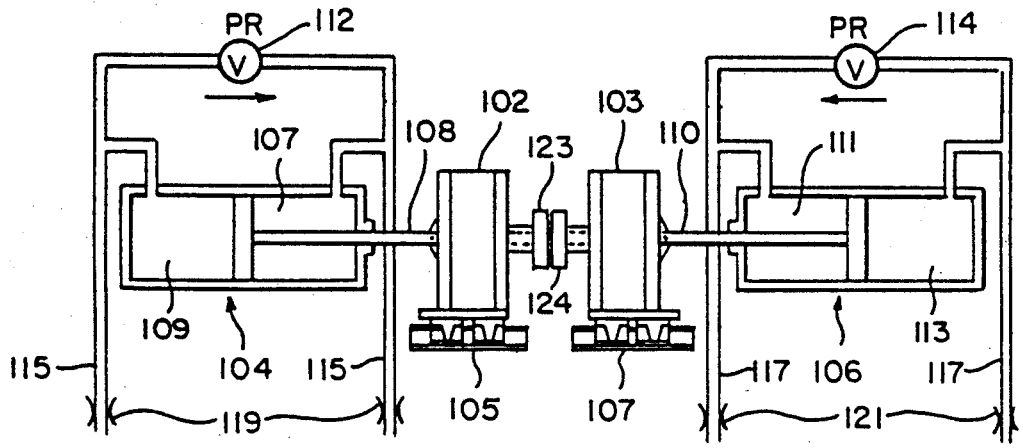

LOW VOLTAGE ELECTROMAGNETIC PULSE ACTUATOR

This is a division of application Ser. No. 054,587 filed on May 27, 1987.

This invention relates generally to the art of high force actuator systems, such as are used in riveting systems and jack hammers and the like, and more specifically concerns an electromagnetic actuator, in which the driver portion is propelled by the repulsion force created by a rapidly rising magnetic flux between the driver and a coil through which a high current pulse is discharged.

BACKGROUND ART

Historically, metal forming has been largely accomplished through strictly mechanical means. As one example, the art of riveting still commonly includes the use of a pneumatic riveting gun, typically in combination with a bucking bar positioned on the opposite side of the workpiece.

Multiple blows of the conventional vibrating riveting gun are used to provide the desired rivet upset. Observation and control by a highly skilled operator is necessary to produce a high quality rivet. Typically the relatively long upset time, i.e. 1-5 seconds, prevents destructive heat build-up in the rivet, and the use of a passive bucking bar is appropriate because of the relatively low momentum of the gun slug.

The conventional riveting gun, however, has the disadvantage of being extremely noisy and its use creates a stressful work place. Also, the requirement of a highly skilled operator, who must control the operation of the gun to produce the desired result, is a disadvantage. Carelessness or lack of attention on the part of the operator can cause expensive damage to workpieces such as airplanes and the like.

Alternatively, a one-shot pneumatic riveting gun is known which has a faster force rise time than the conventional gun. Such a system reduces the need for a highly skilled operator and reduces the overall noise level. However, the force rise time in the oneshot gun is so fast, on the order of 300 microseconds for a system using a ¾ lb. driver, that stress cracks will result in many types of rivets, which is unacceptable. As an example, the 7050 aluminum rivet will typically develop stress cracks if the force rise time is less than 0.5 millisecond. The driver mass could possibly be increased, but because a passive bucking bar is used with the gun, additional problems result. Typically, if the head of the rivet is hit, the plate will move significantly, while if the tail of the rivet is hit, the head of the rivet is pushed out of the hole, both of which are undesirable.

A somewhat related embodiment is known as a C-yoke squeezer which is a large, expensive device which extends around the workpiece to provide an integral backing member. However, such devices are impractical for many applications, since throat depth requirements, i.e. the distance of the rivet from the edge of the workpiece, result in an apparatus which is impractically large and expensive because of the corresponding stiffness demanded for the required throat depth.

Thus, all of the above mechanical devices have significant disadvantages. Electromagnetic techniques were developed to form metal without a mechanical impact. Initially, electromagnetic fields were used to directly form thin sheet metal, such as exemplified in the U.S. Pat. No. 2,976,907 to Harvey et al. Harvey teaches that the shape of very thin conductive sheet metal could be altered to a desirable configuration by placing the sheet metal in close proximity to a spirally wound pancake coil. Discharging a high voltage through the coil resulted in a rapidly rising magnetic flux, which in turn induced eddy currents into the sheet metal. The repulsive force resulting from the magnetic flux was substantial enough to form the thin sheet metal into a desired configuration.

Since the sheet metal was extremely thin, the current pulse through the coil had to have an extremely fast rise time in order to produce the required metal forming effect. Such a system required a very high voltage, on the order of 10,000 volts, and corresponding sophisticated and expensive high voltage switching apparatus and other circuitry. The entire electrical and mechanical system had to be designed to handle such high voltage.

The next significant development in electromagnetic metal forming technology is exemplified by U.S. Pat. No. 3,453,463 to Wilde, which basically added a driver element to the electromagnetic metal forming system of Harvey. This resulted in a general purpose actuator which had many more potential applications than just forming sheet metal. In the Wilde system, a thin layer of copper cladding was added to the base of the driver, with the driver configured to include a long nose section extending outward from the unit. The free end of the nose section was the actuator. Riveting dies or similar elements could be attached to the end of the nose section. This system was, and has continued to be, characterized by a fast current risetime and high voltage, like the Harvey system.

When the Wilde system is used for riveting, the advantages include a significant decrease in noise relative to the pneumatic gun, and the accomplishment of the rivet upset (rivet formation) with just one blow instead of multiple blows. Further, the Wilde electromagnetic system does not require a highly skilled operator who must exercise a significant amount of judgment during rivet formation. Also, because of the narrow force pulse produced by the system, the recoil forces in the system are minimal.

The Wilde system was considered to be a significant advance in the riveting art, and similar systems are in fact currently used, in various configurations, although the pneumatic and C-yoke riveters are still widely used, even with the disadvantages noted above.

Although the general concept of the electromagnetic riveter has been the subject of a relatively large number of patents, such as U.S. Pat. No. 4,423,620 to Hogen-Hout, et al, the basic technology is substantially as outlined above, using a voltage of 5000-10,000 volts, and current and magnetic force rise times of less than 250 microseconds, resulting in a force on the rivet of between several thousand and thirty thousand pounds, as required to accomplish the rivet formation.

However, even such an electromagnetic rivet forming system, with the advantages noted above, has significant operating disadvantages, including the danger of the very high voltages required and the resulting complexity, size, and high cost of the mechanical and electrical systems designed to handle such high voltages.

All of the elements of such a system must be capable of handling the high voltage levels. For instance, the switching devices which switch or "dump" the stored charge from the capacitors into the coil to create the fast rise time current Pulse are ignitrons, which are specially designed to handle the high voltages involved. Long leads are required to connect the elements of the system, since the high voltage power supply is physically large and therefore cannot be positioned close to the workpiece. Further, the required power supply is quite expensive.

It has been discovered that internal cracks can develop in rivets formed by a high voltage electromagnetic riveting system. Such cracks, if not dangerous, are undesirable. They are caused by the extremely fast metal forming rates produced by the high voltage system. It is important to understand that the high voltage electromagnetic riveting system, like the pneumatic riveting gun, is a ballistic system, since the electrical pulse rise time is relatively short compared with the force rise time on the rivet. This means that the energy put into the system by the electrical pulse has been completed well before the work is completed, such that the operation of the system can be characterized by "hurling" the driver against the rivet. The fast metal forming rate can in fact be slowed by increasing the mass of the driver for a particular rivet, but such a mass increase decreases efficiency and is generally considered to be undesirable.

Hence, in summary, present electromagnetic riveting technology, while representing an advance in many respects over conventional pneumatic systems, is basically a large, expensive and generally inelegant apparatus, and requires significant safety precautions.

Accordingly, it is a basic object of the present invention to develop an electromagnetic actuator which is relatively safe to operate, relatively low in cost, and significantly smaller than existing electromagnetic actuator systems, and does not require a highly skilled operator.

DISCLOSURE OF THE INVENTION

The present invention includes an actuator means, which includes a driver which has a first portion which is characterized by being receptive to the establishment of magnetic field currents therein and a second portion which is adapted to receive a tool such as a rivet die or the like for metal forming or other high force impact work. The actuator further includes a coil which is positionable in close proximity to the first portion of the driver. A source of stored charge sufficient to define a selected voltage is adapted so as to produce a current pulse through the coil when the source of stored charge is connected to the coil. Connection of the source of stored charge to the coil is accomplished by a control means, the resulting current pulse in the coil in turn resulting in the induction of magnetic currents in the first portion of the driver. The first portion of the driver is configured such that the current pulse in the coil can be produced by a relatively low voltage, yet can still have a sufficiently fast rise time to produce a force pulse large enough to propel the driver forward away from the coil with sufficient momentum to accomplish the desired impact work.

BRIEF DESCRIPTION OF THE DRAWINGS

FIG. 1 is a system block diagram showing two opposing electromagnetic riveters which each incorporate the electromagnetic actuating system of the present invention.

FIG. 4 is a partial cross-sectional view showing a combination of the coil and driver portions of the electromagnetic actuator of FIG. 1.

FIG. 13 is a graph showing the relationship between current, magnetic force and rivet force for one coil configuration and voltage.

FIG. 14 is a cross-sectional view of the quadrapole connecting cables used in the electromagnetic actuator of FIG. 1.

FIG. 15 is a simplified mechanical view of the recoil apparatus of the present invention.

BEST MODE FOR CARRYING OUT THE INVENTION

Figure 5:
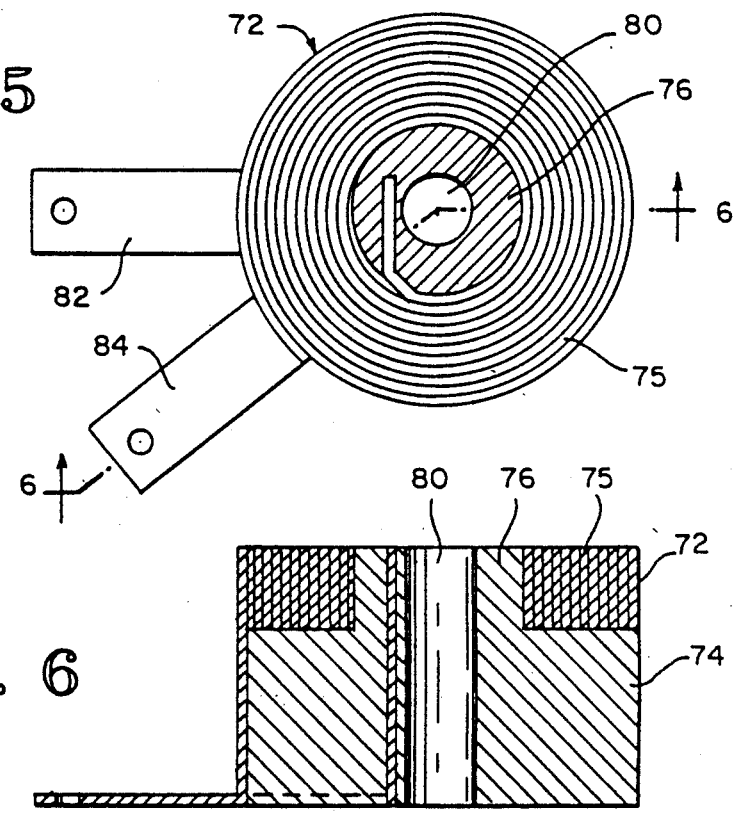
FIG. 5 is a top view of the pancake coil portion of the electromagnetic actuator of FIG. 1.

The present invention is in a broad sense an improved electromagnetic actuator. Electromagnetic actuators are useful in a variety of applications, including several which involve metal forming, such as hammering, punching, and cold working, as well as riveting. Also, such an actuator is useful as an electrical circuit breaker actuator or a mechanical breaking apparatus, such as a jackhammer.

The electromagnetic actuator of the present invention is described herein, however, primarily in the context of an electromagnetic riveting system. Several embodiments of such a riveting system are disclosed herein, including a system having two opposing slide-mounted actuators, as well as a single portable actuator in the form of a riveting gun. However, the present invention is not considered to be limited to a riveting system, except where the claims may so specify.

FIG. 1 shows a simplified block diagram of riveting system incorporating two electromagnetic actuators of the present invention. Electromagnetic actuators 10 and 12 are positioned on opposite sides of a workpiece 14 through which a hole has been drilled to accommodate a rivet. The rivet may be any one of a number of different configurations, but for purposes of explanation and illustration herein is a slug rivet, which is a headless rivet which is deformed equally at both ends by the riveting action, referred to in the art as rivet upset.

Each actuator 10, 12 includes a body 16 in which is positioned a driver 18 and a coil 20 which may include an integral coil body. Also, there may in addition be a recoil mass 23 which typically is secured to the rear surface of the coil body. Extending from the recoil mass 23 is an air cylinder rod 24, which extends out of body 16 into a two chamber air cylinder 26. Associated pressure relief valves and other control elements are shown diagramatically as block 28. The elements in block 28 are responsible for initially positioning the driver 18 against the head of the rivet and further provide a recoil capability for the actuator, as explained in more detail below.

It should be clearly understood, however, that the air cylinder 26 is not used to actuate the driver and thereby perform the riveting work, but only to initially position the elements in the actuator relative to the rivet, and then to control the recoil of the actuator elements following operation of the actuator.

Power is supplied to the system by means of a power supply 30 which operates from a standard AC or DC power line. The DC output power from supply 30 is used to charge a bank of capacitors in circuit 32 to a selected voltage, which depends on the force necessary to accomplish the desired task, up to a typical maximum of approximately 600 volts, but in some cases up to 1200 volts. An electronic switch, such as an SCR, forms part of circuit 32 and is positioned electrically between the capacitor bank 32 and the coil 20.

A trigger signal from firing control circuit 34 activates the switch, having the effect of "dumping" the charge in capacitor bank 32 into the coil 20, resulting in a sharp current pulse through coil 20 of up to 20,000 amps, depending on the amount of the charge. This current pulse results in strong eddy currents being generated in a copper plate 19 at the base of driver 18, by virtue of the very strong magnetic flux in the gap between the coil and the copper plate produced by the current pulse through the coil. The magnetic field creates a repulsive force relative to the coil 20, and the driver 18 is consequently propelled forward with a large force, against the head of the rivet, upsetting the extended end of the rivet and creating an interference fit between the rivet and the workpiece. Unlike conventional pneumatic riveters, a single operation of the present actuator provides sufficient force to the rivet to accomplish the desired upset.

In the system shown in FIG. 1, the voltage control and firing circuit 34 is typically set to provide trigger signals to each capacitor bank at the same time, resulting in simultaneous operation of the two actuators 10 and 12 and thereby the simultaneous application of substantially equal force to the rivet on both ends thereof.

Figure 2:
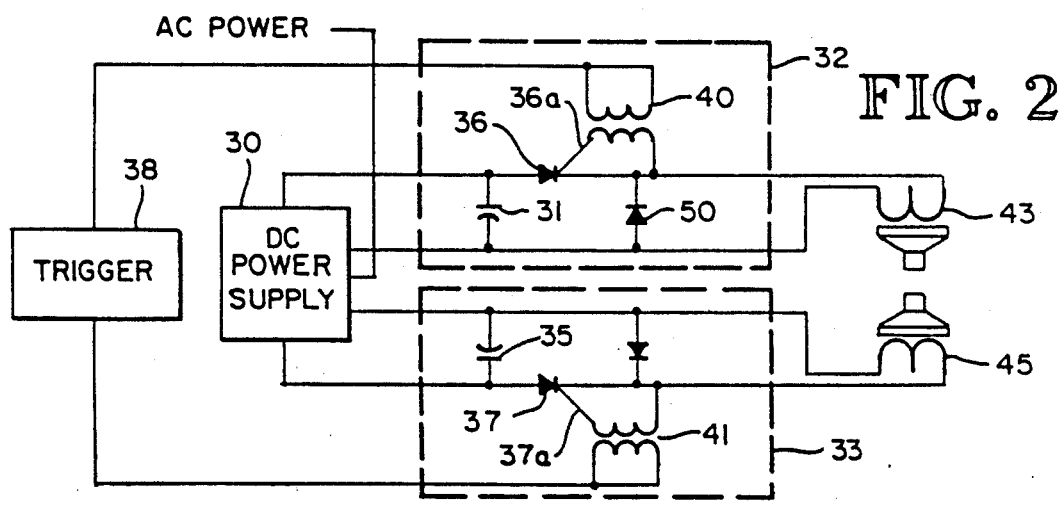
FIG. 2 is a simplified schematic diagram showing in more detail the electrical control and power circuitry shown in block diagram form in FIG. 1.

FIG. 2 shows the circuitry of elements 30, 32 and 34 in somewhat more detail. As indicated above, circuit 30 is a conventional DC power supply, providing a selected output of up to 1200 VDC. This output is used to charge the two capacitor banks 31, 35 in circuits 32, 33. In the embodiment shown the capacitors are electrolytic, each capacitor being approximately 3600 microfarads. Typically, each capacitor bank comprises approximately 4–16 capacitors, connected in parallel, so that the total capacitance of each bank will be approximately 0.015 to 0.06 farad. Circuits 32, 32 also include, respectively, SCRs 36 and 37, which connect the capacitor banks 31 and 35, respectively, to actuator coils 43 and 45.

In the embodiment shown, the voltage control and firing circuit 34 includes a 24 volt power supply which typically comprises a trigger signal circuit 38, which in turn includes a charged capacitor and a switch. Pulse transformers 40 and 41 connect trigger circuit 38 to SCRS 36 and 37. The trigger signal circuit is actuated by the operator, resulting in a trigger pulse being applied to the gate 36a of SCR 36 and gate 37a of SCR 37, which in turn results in high current pulses being directed through actuator coils 43 and 45 from the respective capacitor banks 31 and 35.

In the embodiment shown, the voltage is typically up to 600 volts, although it could be up to 1200 VDC, with a corresponding current of up to 20,000 amperes, depending on the application. The electrical current pulse has a duration of at least one millisecond and a rise time of approximately 500 microseconds. The maximum resulting force pulse acting on the rivet is approximately 130 kilonewtons peak in the embodiment shown, with a force pulse rise time of approximately in the range of 0.5 milliseconds to 1.0 milliseconds.

The rivet force pulse rise time is controlled by both the electrical pulse rise time as well as the driver/rivet dynamics. In the conventional (high voltage) electromagnetic riveting system, the force rise time is much faster, and is determined by the dynamics of the driver/rivet alone. Applicant has discovered that having an electrical pulse rise time approximately equal to the force pulse rise time is advantageous relative to the desired result of rivet formation without cracking, as well as system efficiency, configuration and system cost. Improved operation is also obtained, as discussed in more detail below.

Further, the rise time of the pulse is at a rate such that the tension/compression waves generated within the structure due to the operation of the actuator do not add with the initial force pulse, a condition which would lead to high stresses in the rivet and the possible development of cracks therein.

Since the present invention utilizes a relatively low voltage actuation system, compared to known electromagnetic metal forming systems, which is made possible by a particular design of the driver element, as explained in more detail below, the various elements of applicant's electromagnetic actuation system are relatively small and compact, inexpensive and can be placed relatively close together, with short connecting leads. This is as opposed to the large power supplies and other elements, and long connecting leads characteristic of prior electromagnetic actuators.

The low resistance connecting leads as well as the low resistance switching mechanism and coil of applicant's system result in a system in which the entire loop resistance between the capacitor bank and the coil is less than 50 milliohms 0.050 ohms). The substantial portion of the loop resistance as well as loop inductance for one actuator is in the actuator coil itself, i.e., coil 20 in FIG. 1. This characteristic has the important benefit that the rise time of the force pulse can be effectively adjusted by merely adjusting the impedance of the actuator coil. The advantage of the force rise time being adjustable is that it can be matched to the ideal rise time for the particular application, i.e. for a particular rivet configuration, material and size.

It is known that the impact force rise time in existing electromagnetic systems is frequently too fast, resulting in excessive strain and undesirable interior cracks in the rivets. By properly adjusting the resistance of the actuator coils in the present system, the force rise time can be increased sufficiently that the rivet can be formed without generating such shear cracks At the same time, however, the rise time is still sufficiently fast to generate the actuator momentum necessary to provide a proper rivet upset.

The system of the present invention is referred to as "low voltage", because it uses a voltage which is much lower than that used in conventional electromagnetic actuation systems. The maximum level is approximately 600 volts maximum in the embodiment shown, because that level appears to be a standard in the electrical industry, above which specialized equipment and materials are needed. The present system could operate, however, with similar advantages at voltages somewhat higher than 600 volts, including up to 1,200 volts. Conventional systems, by contrast, require at least 3,500 volts, and up to 10,000 volts.

As mentioned above, the electrical leads in the system are relatively short. They can be coaxial or arranged quadrapole as shown in FIG. 14, in order to minimize lead inductance. In the quadrapole arrangement, cable elements 42 and 44 carry current from the capacitor bank to the actuator coil, while cables 46 and 48 carry return current from the coil.

Referring again to FIG. 2, after the initial discharge or dump of the charge in the capacitor bank through the coils 43 and 45, the resulting current is dissipated in a circuit which includes a flyback diode. Flyback diode 50, for instance, completes the circuit which contains coil 43. Instead of the current causing the electrolytic capacitors in the capacitor bank to charge to a negative voltage, which would result in the destruction of the capacitors, following initial discharge of the capacitors to zero volts, the current is circulated in the coil/flyback diode circuit. The current in the flyback circuit will dissipate over several milliseconds, after which the capacitors are ready to be recharged for another firing cycle.

The electrical circuitry of the present invention, including the SCR switch, the flyback diode and the electrolytic capacitors, are all relatively lightweight and compact, and can be arranged and connected together in a relatively small package and then located in relative close proximity, i.e. within 20 feet, to the actuators. Again, such a structure has significant advantages over existing high voltage systems.

Figure 3:
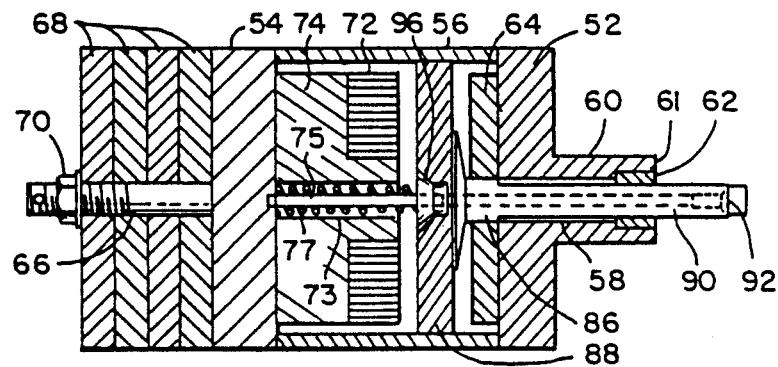
FIG. 3 is cross-sectional view showing the electromagnetic actuator of FIG. 1 in more detail.

FIGS. 3–5 show some more structural details concerning the electromagnetic actuator. In the particular embodiment shown in FIG. 3, the actuator comprises a front plate 52, a rear plate 54 and an intermediate connecting cylindrical tube 56. The upper part of the outline of front plate 52 is semicircular, with a diameter of 5 inches The respective ends of the semicircle extend straight down approximately 2½ inches to termination points which are connected together by a straight line, defining the lower surface of the plate 52. The plate 52 is approximately ¾ inches thick.

Extending from the front of plate 52 is a cylindrical extension 60 which is approximately 1¾ inches long A central opening 58, approximately ¾ inch in diameter, extends through the front plate, including the extension 60. Around the interior surface of central opening 58 in the vicinity of the forward end 61 thereof is a "press fit" oilite bushing 62. The front plate is typically comprised of steel, although it could also be made from aluminum or even plastic.

At the back of front plate 52 is a thin piece of shock absorbing material 64. The shock absorber 64 also has a central opening which is in registry with opening 58 through front plate 52.

The back plate 54 is approximately the same shape and size as front plate 52, and is also made of steel in the embodiment shown. Connecting front and rear plate 52 and 54 is a tube 56 which is made from electrically nonconducting plastic material, having a diameter of approximately 5 inches and a wall thickness of approximately ⅜ inch. Tube 56 is approximately 5 inches long, and is attached to the front and rear plates 52 and 54 by means of longitudinal bolts (not shown) or the like.

Extending rearwardly from the center of back plate 54 is cylindrical rod 66 designed for connection to an air cylinder This rod is approximately ⅝ inches in diameter and approximately 6 inches long in the embodiment shown. It is threaded over most of its length, and is capable of accommodating, in one embodiment, removable weights 68–68 which are adapted to fit along rod 66, beginning adjacent back plate 54 and then against each other in sequence. The removable weights 68 are held in place by a nut 70. The removable weights 68 form a variable recoil mass so as to provide a capability for obtaining desired recoil characteristics in order, for instance, to accommodate a variety of rivet diameters and force requirements. This is a significant advantage of this one aspect of the present invention.

Figure 6:
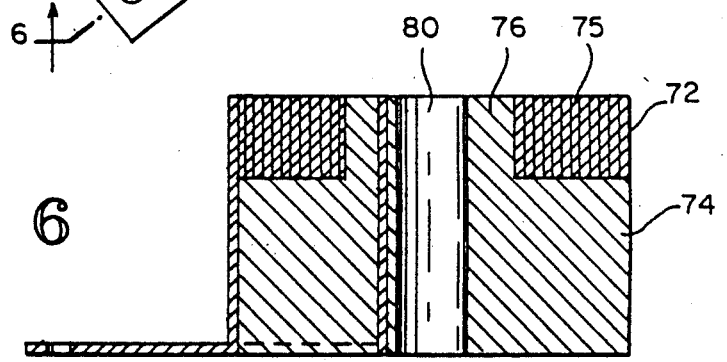
FIG. 6 is a cross-sectional view of the coil of FIG. 5, taken along lines 6—6.

The actuator coil 72 and its associated backing member 74 are secured to the front surface of rear plate 54. The coil backing member 74 is nonconducting plastic, while the coil 72 itself is a pancake coil which in one embodiment is shown in FIGS. 5 and 6. The coil 72 comprises between 10 and 20 turns of a copper strip 75, between 1½–4 inches in diameter. In the particular embodiment shown the coil has 14 turns, and is 1.6 millimeters thick. The overall length of the strip 75 is 2.8 meters and it has a very low DC resistance of 1.6 milliohm (0.0016 ohm). The copper strip 75 is wound around a plastic hub 76 with a central passage 80. The hub 76 is an integral extension of the coil backing member 74 in the embodiment, as shown most clearly in FIG. 6 Two leads 82 and 84 extend from the respective ends of the copper strip 75 as shown.

FIG. 3 also shows a driver 86, as does FIG. 4. Driver 86 is comprised primarily of high quality steel but includes a copper driver plate 88 at the rear end thereof. Driver 86 also includes an elongated rod portion 90 which extends forwardly and is approximately 5 inches long and 11/16 inches in diameter over most of its length At the rear end of the driver adjacent the copper plate, the steel portion is approximately 2½ inches in diameter The copper plate 88 has a diameter of 3¾ inches. At the forward end of the rod portion 90 is a rivet die 92, which contacts the end of the rivet, which in turn is prepositioned in a workpiece (not shown).

In the embodiment of FIG. 3, the copper plate is held against the rear surface of the steel driver by a plug 96 which fits into a mating central opening in the rear surface of the copper plate. Bolts hold the plug and the copper plate in place relative to the steel driver. A central opening 73 extends the axial length of the coil/coil backing member as shown. Driver 86, including plug 96, also has an axially extending central opening. Positioned in the central openings of both the coil/coil backing member and the driver 86 and extending therebetween is a rod 75. Positioned on the rod 75 is a spring 77, which tends to maintain a gap between the coil and the driver plate 88 until clamp-up is completed. This prevents damage to the apparatus through unintentional discharge of the capacitors.

In the embodiment of FIG. 3, the diameter of the driver at the copper plate is just slightly less than the inside diameter of the connecting tube 56, so as to provide support but still permit movement of the driver. The rod portion 90 of the driver has a sliding fit with bushing 62, so that the driver is physically supported both at the front and rear thereof. The driver is, however, free to move axially relative to front plate 52.

In operation, when the electrical pulse is applied to the actuator coil, the strong repulsive force created by the magnetic flux 89 (FIG. 4) concentrated in the gap between the coil and the copper plate results in a high speed propelling of the driver forward, forcing the rivet die against the end of the rivet, forming the rivet and creating an interference fit.

The thickness of the copper plate is an important consideration in the present invention. The plate is designed to permit the use of relative low voltage. Basically, electromagnetic actuators have heretofore used a relatively thin copper plate, on the order of 3 millimeters, because the teaching in the art, as discussed above, was directed initially toward metal forming of thin metal sheets. Forming thin metal sheets to a desired configuration required a high voltage, with an extremely fast current rise time, in order to obtain the necessary force before the magnetic field diffused through the copper plate. The use of very thin copper sheets, and high voltages, have continued since then, including in existing electromagnetic riveters.

Applicant has substantially increased the thickness of the copper plate, which permits the use of a substantially lower voltage and a slower electrical rise time, while still resulting in the development of sufficient force to accomplish the desired work.

The thickness of copper plate 88 must be sufficient to permit only negligible diffusion of the magnetic fields induced therein the electrical rise time of the magnetic force is equal to the rise time of the current pulse if magnetic diffusion is not an issue. If diffusion is a significant consideration, as it is with thin copper plates, the electrical rise times must be extremely fast to produce the desired rivet force before the magnetic force is severely affected by diffusion.

Applicant has substantially increased the thickness of the copper plate to reduce the diffusion of the magnetic force, thereby permitting the use of slower electrical rise times to produce the same rivet force. This in turn reduces the system voltage necessary. The applicant has discovered that the plate thickness should be at least one magnetic diffusion length, and preferably in excess of two diffusion lengths for the relatively slow rise time of the preferred embodiment. Magnetic diffusion length is discussed in a book titled *Electromechanical Dynamics, Part II: Fields, Forces and Motion*, by Herbert H. Woodson and James R. Melcher, which is incorporated by reference herein. With respect to the embodiment shown, a plate thickness within the range of 6–18 millimeters has been found to provide adequate results, while a thickness of less than 5 millimeters provides generally unacceptable results by virtue of the increase in voltage and other characteristics required. Although the present invention uses a copper plate, it should be understood that the plate could be made of any material which is highly electrically conductive, including aluminum, silver or copper alloys.

As indicated above, the present system provides sufficient force with one actuation to perform a riveting function, whereas most commercial pneumatic actuators require multiple blows, aside from the oneshot pneumatic device, which is rarely used. A substantial advantage over pneumatic actuators is the significant reduction in noise, as well as the elimination of the necessity of highly skilled operators, since repeated blows are not necessary. The relatively slow rise time and long pulse duration used in the present invention, both electrical and force, reduce the noise even further from the levels generated by conventional electromagnetic actuators.

The electrical pulse duration time is about the same as the force rise time in the present embodiment, which contributes to noise reduction and is discussed further below. The slower force rise time, i.e. greater than 500 microseconds, has several other advantages, including reduction in the modes of resonance of adjacent structures, and permits the use of the apparatus of the present invention with offset tooling without causing structural damage thereto.

The rivet interference pattern has also been found to be improved using the present invention with the stated relatively slow rise times. In particular, the interference pattern exhibits less of an hour-glass appearance compared with conventional electromagnetic pulse actuators. An hour-glass appearance is generally undesirable. Conventional high voltage electromagnetic actuators, with their fast forming rates, reduce the shear strength of the rivet head through strain heating, prematurely increasing the diameter of the head and spreading the pressure to the plate rather than down through the rivet body. The metal forming rate is reduced in the present invention to a point below the natural frequency of the driver/rivet upset dynamics by careful matching of the magnetic force pulse duration to the rivet impact force rise time, which is conveniently possible with the present invention, but which is not done with conventional high voltage electromagnetic actuators. In addition, the relatively long magnetic force rise time provides a magnetic cushioning effect, which is explained in more detail below, to protect the coil from impact resulting from springback or rebound of the driver off of the rivet.

It should be understood that the above described "low voltage" actuator can be used either as a single unit or as a pair of actuators comprising a system controlled by a single firing circuit, such as shown in FIG. 1. Referring again to the circuit of FIG. 1, both of the SCRs associated with the respective actuator coils can be fired simultaneously with simultaneous trigger signals. Other means can be used for triggering the electronic SCR switches, including a radio wave or optical means, among others.

Thus, unlike the conventional high voltage electromagnetic actuator system, which is wired in series in order to provide the required simultaneous excitation of the two actuators, the actuators comprising the system of the present invention are independently wired, except for a possible common gate signal. This helps to reduce the length of the connecting leads and permits a more compact system design. The two actuators 10 and 12 in FIG. 1 are identical, and the two capacitor bank/thyristor circuits are also identical. The system of FIG. 1 results in the force generated by the two actuators being approximately equal, which in turn will insure that the workpiece in which the rivet is prepositioned remains substantially still.

It should be understood, however, that there can be slight differences in the timing of the trigger signals in the system of the present invention, as well as in the total charge of the capacitor banks for the respective actuators. This will result in a controlled difference in the impact of the two drivers, if this is desirable in a particular application.

The electromagnetic actuator system of the present invention has the further advantage of being positionable a selected distance from the edge of the workpiece without regard for conventional edge limitations, which is referred to as throat depth. Thus, the opposing, synchronous operation of the two actuators can apply substantially equal force to opposite sides of a plate at substantially any location on the plate.

FIG. 13 is a graph which clearly shows the relationship between the electrical pulse time, the resulting magnetic force and the rivet impact force for the electromagnetic actuator of the present invention. FIG. 13 is for a system configuration operating at approximately 300 volts, with a coil configuration shown in FIGS. 5 and 6. FIG. 13 shows that the magnetic force curve 98 is almost coincident with the rivet force curve 99, with the rivet force continuing to increase, as the magnetic force holds steady, until the rivet work is completed at point 101. Also, the current pulse curve 100 continues to a peak until approximately the time that the rivet work is complete. This means that the electrical pulse, and hence the magnetic force pulse, continues to exert an effect on the driver up to and even past the time that the rivet work is completed.

Such a system is very different from the ballistic-like high voltage electromagnetic actuator, in which the electrical pulse is finished well before substantial work on the rivet is accomplished. The present system, with its slower electrical rise time, allows for a lower system voltage, as explained above. Note in FIG. 13 that the the electrical pulse duration, the magnetic force duration and the rivet force pulse time on the rivet are approximately equal. This has advantageous implications for system operation and efficiency, as discussed above. Since the magnetic force persists beyond the time that the work on the rivet is completed, it will still be present during the time that the driver is rebounding or recoiling from the rivet. The continuing magnetic force will act to slow down the returning driver, thereby providing a so-called magnetic cushioning effect.

Figure 12:
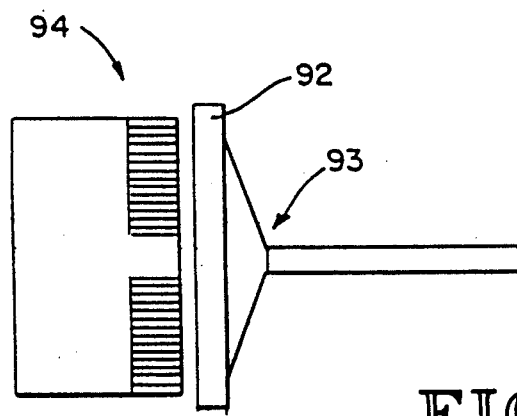
FIG. 12 is a simplified cross-sectional view showing a particular arrangement of the coil and the driver plate of the electromagnetic actuator of FIG. 1.

FIG. 12 shows a variation of the arrangement between the coil and the driver in an actuator of the present invention. Typically, the exterior diameter of the copper plate portion 92 of the driver 93 will be the same diameter as its associated coil 94. In this variation, the plate 92 is approximately at least 5% greater than the diameter of the coil 94. This variation has the advantage of improved system efficiency.

FIG. 15 shows the recoil system of the present invention, for use in particular with the embodiment shown in FIGS. 1 and 3. The actuators shown in FIGS. 1 and 3 are shown as elements 102 and 103, which are shown as supported on associated roller bearing and track assemblies 105 and 107. The associated air cylinders are shown as 104 and 106, respectively, connected by air cylinder rods 108 and 110.

Each of the air cylinders 104 and 106 contain front and rear chambers, 107, 109 for cylinder 104 and 111, 113 for cylinder 106, with the two chambers of each cylinder being connected by one-way pressure relief valves 112 and 114. The recoil structure includes a source of air pressure (not shown) in the range of 20-150 PSI. The source of air pressure is connected alternately to the two chambers of each air cylinder and to the respective pressure relief values 112 and 114, through feeder lines 115, 117. Feeder lines 115, 117 each include conventional restrictors 119, 121, as shown.

Initially there is sufficient air pressure supplied to the rear chambers of the respective air cylinders to force the actuators forward in contact with the rivet to be worked. This is referred to as clamp-up force. Clamp-up force can also be distributed to the plates to be riveted by means of pressure feet 123, 124 which force any gap between the two plates to be closed.

When the system is fired, the source of air to the air cylinders 104 and 106 is cut off, so that relative to the short time duration of the rivet upset and subsequent actuator recoil, the restrictors 119, 121 effectively isolate the air cylinders from the environment. As the actuators recoil from the rivet, the pressure in the rear chambers 109, 113 of each air cylinder increases. The pressure relief valves 112 and 114, which are one-way valves, are designed in the embodiment shown to release at a pressure which is slightly greater than the selected clamp-up pressure, i.e. from several PSI to 150 PSI. When the pressure relief valves release, air is vented to the front chambers 107, 111 of the air cylinders and the recoil momentum of the actuator decreases until the actuator stops. At that point, the actuator is ready to be clamped up and operated again.

Figure 16:
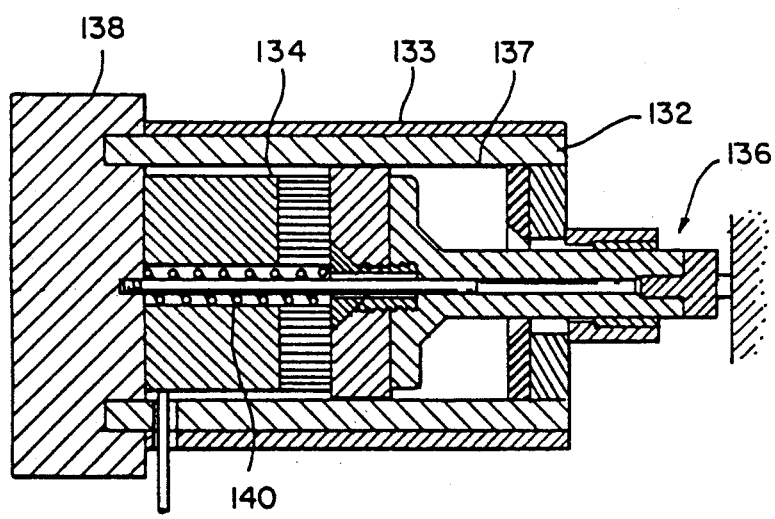
FIG. 16 a cross-sectional view of an electromagnetic riveting apparatus featuring a sliding cylinder within an external sleeve.
Figure 18:
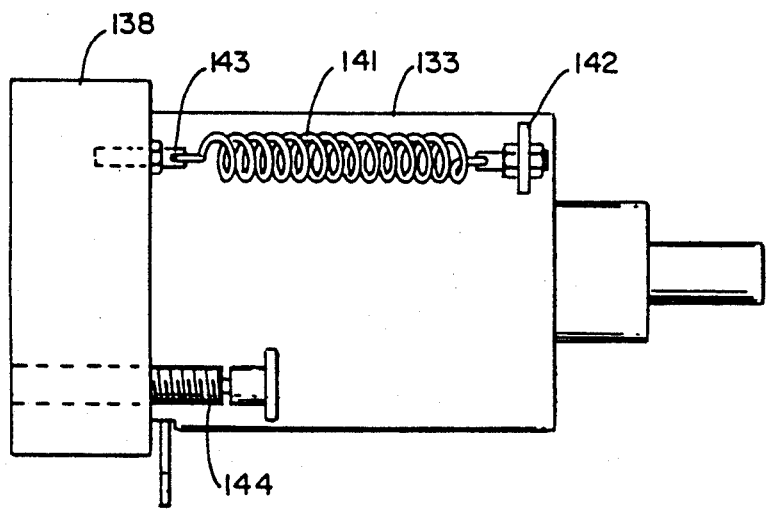
FIG. 18 is an exterior view showing the embodiment of apparatus of FIG. 16 which includes a particular recoil/damping system.

FIGS. 16 and 18 show an embodiment of the actuator of the present invention, appropriate for certain applications, such as robotics, in which the function of the air cylinder is accomplished by a spring/damper system. The embodiment of FIG. 16 includes a movable plastic body 132 within a stationary stainless steel sleeve 133, a coil and coil backing 134, a driver 136 with a copper plate 137, a recoil mass 138, and an external spring-/damper system (FIG. 18).

The driver, coil and recoil mass are supported in a tubular body 132 which slides and provides bearing support within the stationary sleeve 133. An internal spring 140 urges the driver 136 and connected plate 137 forward, in lieu of clamp-up against a workpiece. The action of the spring 40 also results in a space between the coil 134 and copper plate 137. If the apparatus is accidentially fired when the coil and driver are in this relationship, the resulting force on the driver will be relatively small. Hence, prior to clampup, when the driver is not in contact with a rivet or the like, the spring 140 prevents possible harmful impact of the driver against the front plate.

Referring to FIG. 18, an external spring 141 is connected between two external fixed tabs 142, 143, wherein one tab 142 is connected to the sleeve 133 in the vicinity of the front end thereof and the other tab 143 is connected to the recoil mass. The spring 141 absorbs the recoil of the actuator. A hydraulic damper 144, connected between the recoil mass and a tab fixed to the sleeve 133 near the rear end thereof, absorbs the springback effect of the spring 141. The spring 141 and damper 144 in combination bring the actuator gently to a stop.

Figure 17:
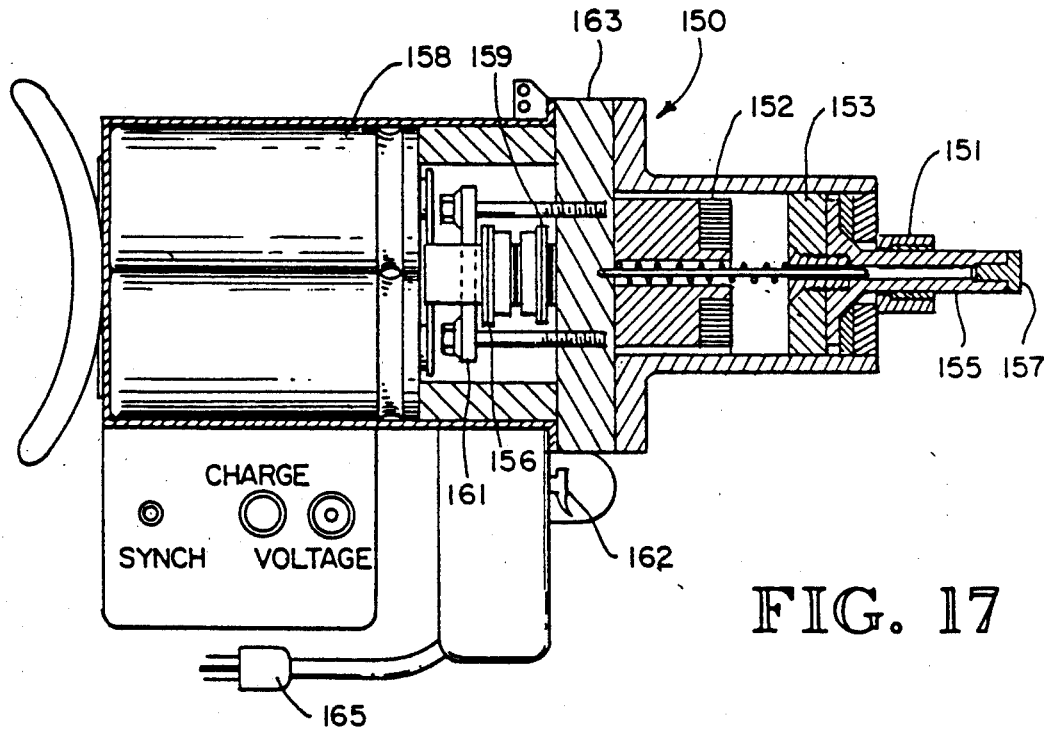
FIG. 17 is a cross-sectional view showing a self-contained, high current riveting gun using the principles of the electromagnetic actuator system of the present invention, wherein the elements for developing the high current pulse are positioned inside the gun.

FIG. 17 shows a gun-like embodiment somewhat similar to that of FIG. 16, in which the electrical circuitry is contained within the gun body as well. The embodiment includes a body 150, a coil 152 and a driver 154 which includes a copper plate 153 and a driver stem 155 which extends through the nosepiece 151. A rivet die or other tooling 157 is secured to the front end of the driver stem 155. A spring arrangement 149 extends between the driver and the coil. The driver stem is shown in its fully extended position. To the rear of the backplate 163 is the flyback diode 159, the SCR 156 and a press clamp 161. At the rear of the unit are the electrolytic capacitors 158. The body 150 includes a housing for the capacitors and the other electronic elements. This unit may be used either with an external source of power through a plug 165, or a clip-on battery pack, and is actuated by means of a conventional trigger 162. Other controls, including voltage control, charge control and a synchronization jack are provided. This unit is designed to be used in those situations where a portable hand-held actuator would be useful.

Figure 7:
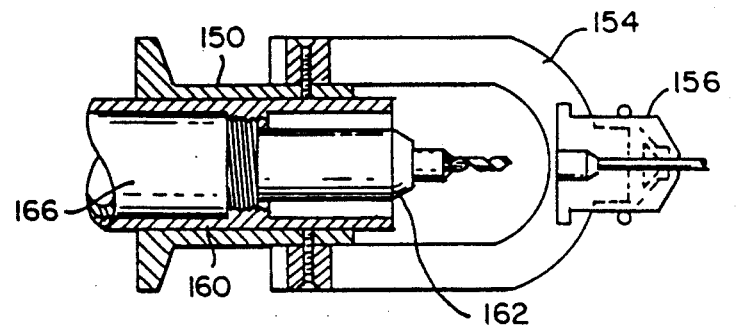
FIG. 7 is a partial cross-sectional view of a combined riveting and drilling system incorporating the principles of the present invention.
Figure 8:
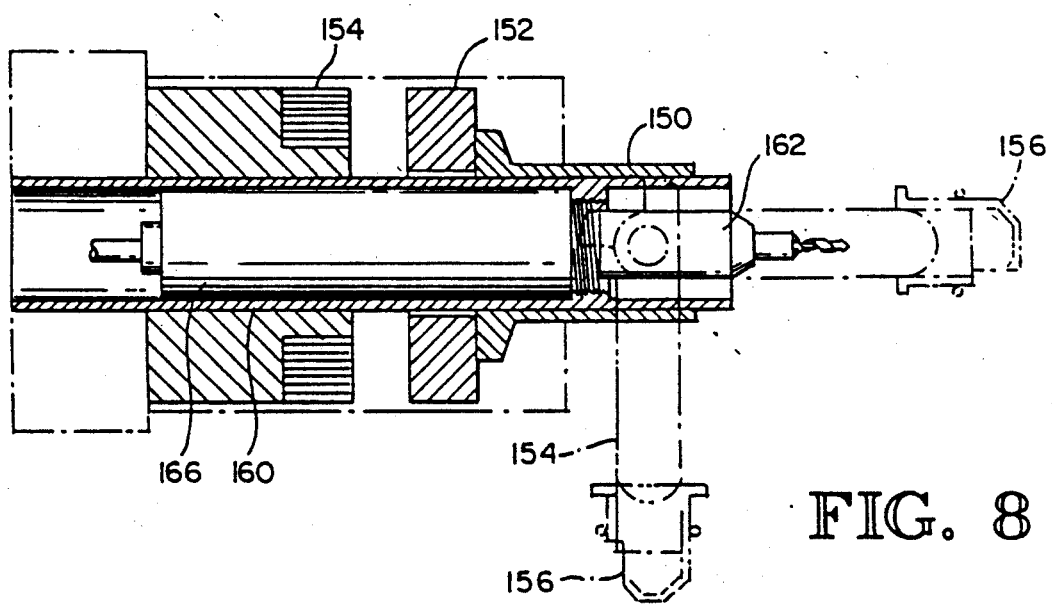
FIG. 8 is another partial cross-sectional view of the combined riveting and drilling system of FIG. 7.

FIGS. 7 and 8 show an electromagnetic actuator of the present invention with a hollow center portion, in which is housed a drilling apparatus. A driver sleeve 150 has an internal diameter of 1¾". Secured to the rear end of sleeve 150 is an annular driver copper plate 152 having a slightly larger internal diameter than sleeve 150 An annular coil/coil backing member 154 is positioned to the rear of the driver plate. The actuator is contained within a body (not shown) which in turn may be supported for axial movement on a robot arm or other support structure.

Attached to the sleeve 150 is a hoop 154 which extends out to the front of the end of the driver sleeve. The hoop 154 is mounted so as to permit ninety degree rotation. One operating position for the hoop is directly out to the front, parallel to the axis of the actuator. At the front of the hoop 154 is a rivet finger assembly 156 which is capable of holding the rivet and inserting it into a predrilled hole. A portion of the front of the hoop is configured to function as a rivet die and thus acts to form the rivet as a result of the firing of the actuator. In the second operating position, the hoop is rotated out of the way of the front of the device, exposing the free end of the driver sleeve 150. In the embodiment shown, the rotation is 90 degrees in the direction shown, but it could be otherwise, i.e. within the range of 45 degrees or more to either side of the center position.

Positioned in the hollow center of the driver sleeve 150 is a bearing sleeve 160, which fits against the interior surface of driver sleeve 150. Attached to the bearing sleeve 160 in a threadable relationship is a conventional rotary drill assembly 162, which extends a distance out from the front end of bearing sleeve 160. Rotary motion is imparted to the drill by means of a conventional air rotor 166, which is positioned within bearing 160, behind the drill 162. By virtue of the configuration of the structure, there is no need to have the rotary drill assembly be independently axially transportable. When the hoop is rotated out of the way, the entire apparatus can be axially transported to perform the required drilling operation. When the hoop is in front, riveting can be performed.

The above structure has the capability of performing as a drill, and accomplishing rivet insert and rivet upset with axial transport only of the entire structure. System complexity, size and weight are thereby reduced, particularly important considerations in robotics. Cost of the system is also reduced.

In the drilling operation, the hoop is in its 90 degree position, as shown in FIG. 8, out of the way of drill 162. The entire unit is then moved forward, until the drill bit contacts the plate. The drill is then rotated at a selected speed to accomplish the desired drilling and countersink and then the entire unit is axially withdrawn. At this point, the hoop 154 is rotated 90 degrees into the riveting position, as shown in FIG. 7. A rivet is inserted into the rivet fingers, or previously picked up by the fingers, and the unit is then moved forward to insert the rivet in the hole. The rivet die portion of the hoop 154 is then moved forward against the rivet and the actuator is fired, resulting in the accomplishing of the rivet upset as described above.

Figure 9:
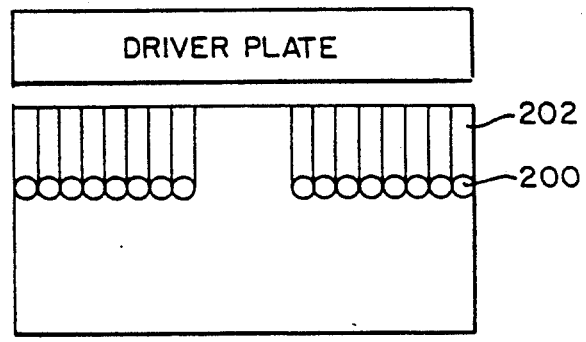
FIG. 9 is a simplified cross-sectional view showing one means of cooling the coil of the electromagnetic actuator of the present invention.
Figure 11:
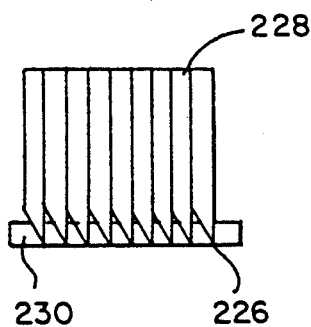
FIG. 11 is a simplified cross-sectional view showing still another means for cooling the coil of the electromagnetic actuator of the present invention.
Figure 10:
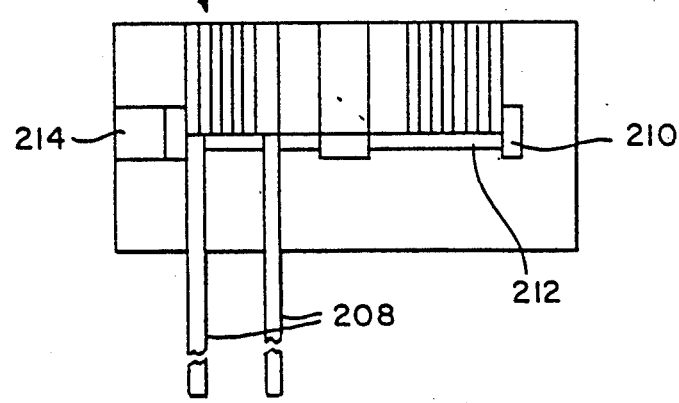
FIG. 10 is a simplified cross-sectional view showing another means for cooling the coil of the electromagnetic actuator of the present invention.

FIGS. 9 through 11 show various means for cooling the coil, if necessary. Referring to FIG. 9, a small tube-like element 200 extends along the entire length of the copper strip comprising the coil 202 at its rear surface. This tube-like element 200 thus forms a passageway along the lower edge of each winding of the coil. Element 200 could be an integral part of the coil strip or a separate element attached thereto. The passageway formed by the element 200 would permit a cooling fluid to be circulated therethrough, thereby providing for good heat transfer between the individual windings and the environment. This arrangement would be practical if the thickness of the windings is approximately equal to or greater than 1/16th inch.

FIG. 10 shows another coil cooling system. The coil 206 and leads 208 are shown conventionally. An air plenum 210 extends around the lower portion of the coil. Radial air passages 212 extend beneath the coil connecting to the air plenum 210. Air is forced into the plenum 210 and passages 212 through inlet 214.

FIG. 11 shows a further embodiment in which radial passages are provided through the coil windings in the vicinity of the rear surface of the coil. The electrical insulation integrity of the coil windings is maintained by beveling the edges 226 of the windings opposite from edges 228 which are adjacent the driver. The interwinding insulation space is thus increased. The radial space 230 provided by the beveling may be filled with an electrically insulating but hard material to facilitate the drilling of cooling passages therein without resulting in electrical bridging of adjacent turns of the coil. Acid etching and/or laser techniques may be used to enhance the creation of the cooling passages. Further, such passages may also be carefully etched by acid or cut away by a laser in unbeveled windings.

Generally it is desirable to have radial passageways in the vicinity of or adjacent the rear surface of the coil, including passageways in the coil windings themselves. The embodiments of FIGS. 10 and 11 illustrate a few specific means for accomplishing such radial passageways.

Thus, an electromagnetic actuator has been described which has significant operational and practical advantages over existing high voltage electromagnetic actuator systems In particular, the present actuator is less expensive, much safer to use, and provides a high degree of control over the metal forming action. It should of course be understood that the invention, while described in the context of an electromagnetic riveting system, car be used in other actuation systems. For instance such an actuation system is useful in numerous metal forming applications, as well as cold working, punching or chipping metal or concrete or the like, in hammering applications, such as jackhammers, and in electrical switching circuits, where the application of large mechanical force is necessary.

Although preferred embodiments of the invention have been disclosed herein for illustration, it should be understood that various changes, modifications, and substitutions may be incorporated in such embodiments without departing from the spirit of the invention as defined by the claims which follow.

What is claimed is:

1. An electromagnetic pulse actuator, comprising:
   an electromagnetic actuator means, including (a) a driver having a first portion which is receptive to the establishment of magnetic field eddy currents therein and a second portion which includes a first work assembly means to accomplish riveting or other high-force impact work and (b) a coil which is positionable in close proximity to said first portion of said driver, wherein the actuator means has a configuration defining an axially open center area;
   a source of stored charge defining a selected voltage, adapted to produce a current pulse through the actuator coil when connected thereto;
   control means for selectively connecting the stored charge to the coil, thereby producing a current pulse in the coil which in turn produces a magnetic force pulse large enough to propel the driver forward with sufficient momentum to accomplish the desired high force impact work; and
   a second work assembly means positioned in the open center area of said actuator means for accomplishing additional work other than high force impact work, such as drilling.

2. An apparatus of claim 1, including means for axially moving said actuator means together with the second work assembly means.

3. An apparatus of claim 2, including means for rotating said second work assembly means at a relatively high speed.

4. An apparatus of claim 3, wherein said rotating means is an air motor.

5. An apparatus of claim 1, wherein the second portion of the driver includes a hoop-like element which extends to the front of the apparatus in a first position, and wherein the hoop element is mounted such that it can be moved away from the front of the apparatus into a second position.

6. An apparatus of claim 5, wherein the second work assembly means is mounted is such a manner, and wherein the hoop element is configured such that when the hoop element is in its second position, the additional work can be accomplished by said second work assembly means without movement of the actuator means.

7. An apparatus of claim 6, wherein the hoop element includes, at the front edge thereof, means for holding a rivet and for forming the rivet after insertion of the rivet into a hole in the workpiece adapted to receive such rivet.

8. An apparatus of claim 1, wherein the magnetic force pulse has a sufficiently long pulse duration that it is still present to an extent during springback travel of the driver back toward the coil from the workpiece to slow the movement of the driver, thereby tending to prevent damaging impact between the driver and the coil.

* * * * *